Feb. 28, 1939. L. W. BLAU ET AL 2,148,679

USE OF HIGH FREQUENCIES IN MEASURING CHANGE IN ELECTRICAL IMPEDANCE

Filed Dec. 28, 1934

Ludwig W. Blau
Robert R. Thompson  Inventors
Whitman D. Mounce
By W. F. Weigester Attorney Patented Feb. 28, 1939

2,148,679

UNITED STATES PATENT OFFICE 2,148,679

USE OF HIGH FREQUENCIES IN MEASURING CHANGE IN ELECTRICAL IMPEDANCE

Ludwig W. Blau, Robert R. Thompson, and Whitman D. Mounce, Houston, Tex., assignors to Standard Oil Development Company, a corporation of Delaware Application December 28, 1934, Serial No. 759,512

6 Claims. (Cl. 177—352)

This invention relates to improvements in geophysical prospecting. More particularly it relates to the use of high frequencies in detecting variations in the resistance of the ground caused by earth vibrations.

This application is an improvement over the copending application of Ludwig W. Blau and Louis Statham, entitled "Method and apparatus for seismic prospecting", Serial Number 759,348, filed December 27, 1934, as a division of Serial Number 647,084, filed December 14, 1932, the former application now being Patent No. 2,054,067, issued September 15, 1936, and the latter application now being Patent No. 2,046,104, issued June 30, 1936.

In said patent is described a geophysical prospecting method known as seismic electric prospecting which differs from conventional seismic prospecting in that the conventional seismic pickup is replaced by a pair of electrically connected electrodes which are arranged in the ground at the receiving point and which are connected to a source of electrical power for feeding a current through the ground. The arriving seismic waves produce changes in the electrical properties of the ground which are reflected in the current passing through the circuit connecting the electrodes.

In the practice of this method difficulty was encountered in achieving the desired sensitivity in the receiving circuit, when direct current was employed. When highly sensitive recording devices were employed with a low value of applied D. C. voltage, the effect of the natural ground currents became noticeable. When the current used in the circuit was increased in order to permit the use of a less sensitive recording instrument to thereby eliminate the effect of the natural ground currents, an effect analogous to frying" in a microphone was encountered. This effect apparently was due to the action of the current itself on the subsurface.

The present invention is based on the discovery that undesirable "frying" is eliminated by employing a high frequency current in the receiving circuit. Why this is so is not definitely known, but it is assumed that it is due to some inherent difference between the effect of high frequency current and that of direct current on ground through which seismic waves are traveling.

In the practice of the present invention, a source of high frequency current is connected to the input side of the electrode circuit and a detector is connected to the output side of such circuit, said deector being, in urn, connected to an audio-frequency amplifier to which a recorder is connected.

A notable feature of the method of the present invention is that the high frequency current is employed only as a carrier wave upon which are impressed modulations by the seismic waves. It is not desired to record the carrier wave, since only the modulations are of significance. It is also important to provide for the elimination of the effect of the low frequency ground roll on the receiving circuit.

Accordingly, the detector is inductively coupled to the output side of the electrode circuit through a transformer or equivalent device which is naturally so selected as to operate efficiently at the frequency employed in the receiving circuit, i. e., the frequency of the carrier wave. When so selected it, of course, necessarily prevents the low frequency impulses created by ground roll from passing through the detector and transmits to the detector only the carrier wave in its modulated form.

In order that only the modulations of the carrier wave may be recorded, an audio-frequency amplifier is connected to the output of the detector as hereinafter described. This amplifier will amplify only audible frequencies. The carrier wave employed, according to the present invention, on the other hand, has a frequency of several thousand cycles. This frequency being considerably above audio-frequency, the amplifier will not transmit the carrier wave to the recording device. The modulations of the carrier wave, however, which are created by the seismic waves which have a frequency of the order of 100 to 200 cycles per second which is well within the audio-frequency range, are amplified and transmitted to the recording device as hereinafter described.

The invention will be fully understood from the following description taken in connection with the accompanying drawing in which latter—

Figure 1:
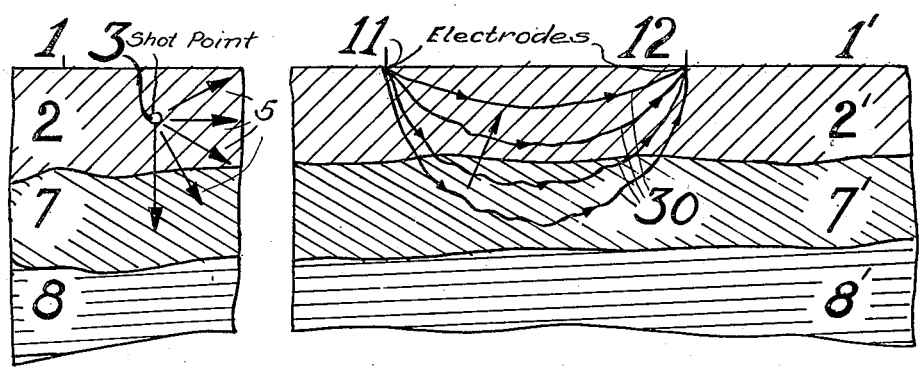
Fig. 1 is a vertical sectional view through the earth showing spaced electrodes disposed in spaced relation to a source of seismic disturbances.

Referring particularly to the drawing, reference numerals 1, 1' designate the surface of the ground and 2, 2' designate a low velocity layer near the surface of the ground. Numeral 3 designates a source of seismic disturbances which may be generated by a continuous wave oscillator, a falling weight, an explosion or in any other way known to the art. Elastic waves 5 travel radially outwardly from the shotpoint 3 in all directions but a large part of the energy is propagated in the low velocity layer 2, 2', because surface waves are naturally of low frequency and because the amplitude of the surface waves decreases inversely with the distance. Some of the waves travel downwardly and are reflected from lower earth strata designated 7, 7' and 8, 8'.

Means are provided for receiving over a continuous extended volume of the earth, including subsurface strata the wave energy arriving throughout the volume from the source 3 of elastic waves. The means comprises electrodes 11 and 12 which may be porous cups buried in the ground for a depth which may be from a few inches to several hundred feet depending upon the conditions obtaining near the surface of the ground. As a rule, there is a low velocity layer such as 2, 2' at the surface of the ground and it often becomes desirable to bury the electrodes below the low velocity layer so that the reflected waves will not be affected by the low-velocity layer. Any other suitable type of electrode may be used. The lines of electric force cover an extended volume around the electrodes and above, as well as below, the electrodes as indicated in Fig. 1, and consequently unless the electrodes are buried to a very considerable distance the direct waves will pass through the lines of electric force.

An electric circuit connects the electrodes including a source of electric energy of given frequency such as an oscillator 15, the frequency of which may be controlled by a crystal, not shown. We have found it convenient to use a frequency of 60 kilocycles but lower or higher frequencies can be used if desired. The primary 16 of transformer 17 is connected across the output of the oscillator 15. The secondary 18 of this transformer is connected across the electrodes 11 and 12 and also across the primary 20 of the transformer 21. The secondary 22 of the last mentioned transformer is connected to the input of a detector 23, which is sensitive to alternating voltages of frequencies near the frequency of the oscillator 15. The output current of the detector 23 is amplified by the audio-frequency amplifier 25. The amplified current is then recorded by means of a recorder 26.

Figure 2:
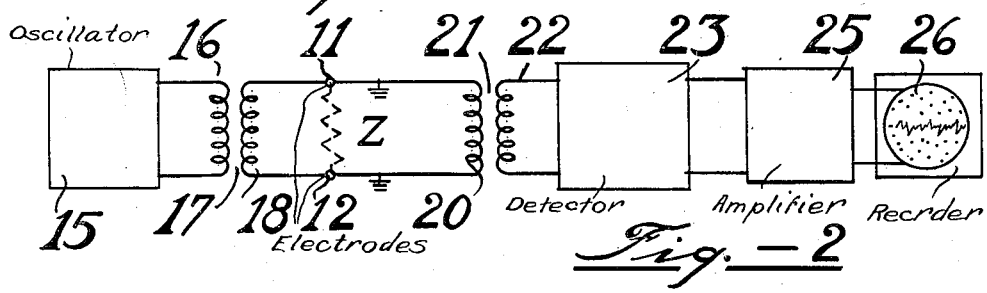
Fig. 2 is a diagrammatic view of a preferred form of apparatus for measuring the change of electrical impedance of the ground due to the seismic disturbances.

The oscillator 15 causes a flow of electric current of predetermined frequency through the ground between the electrodes 11 and 12, thereby producing lines of electric force designated 30. The impedance of the ground between the electrodes is designated Z and shown in dotted lines as a resistance in Fig. 2. The lines of electric force 30 pass through the surface layer 2, 2' in the embodiment illustrated directly between the electrodes 11 and 12. Other lines of electric force 30 extend into the subsurface stratum 7, 7'.

Mechanical vibrations change the electrical resistance Z of the ground. The arrival of the waves in the vicinity of the electrodes 11 and 12 therefore changes the electrical resistance of the ground around the electrodes, and hence changes the flow of current between the electrodes. The electrodes 11 and 12 are connected in parallel with the adjoining secondary winding 18 and primary winding 20 of the transformers. Due to changes in electrical impedance of the ground, the current in the primary 20 of the transformer 21 changes. This change is impressed by means of the secondary 22 of the transformer upon the detector 23. The resulting changes in the amplitude of the frequency voltage applied to the detector 23 produce changes in the output current of the detector 23 corresponding to the motion of the ground. The change in current is amplified by the amplifier 25 and is recorded by a suitable recorder such as the oscillograph 26 which preferably records photographically the changes due to these seismic disturbances.

A notable feature of the arrangement described above is the fact that the grounded electrical circuit has no direct connection with the oscillating circuit. This structure permits resistance effects to appear only as mutual inductance effects in the oscillating circuit. It is to be understood that the lower is the impedance of the electrical circuit through the earth between the electrodes, the lower will be the apparent inductance of the primary winding 16 and the higher, therefore, will be the frequency of the circuit consisting of the inductance of the primary winding 16 of the oscillator. This change in the apparent inductance is due to the effect of the mutual inductance of the transformer upon the effective inductance of the system.

Thus, the receiving circuit above described oscillates regardless of how high or low the resistance involved in the ground impedance may become, whereas, if the output of the oscillator were connected directly across the electrodes, some difficulty might be encountered in maintaining the oscillations. Changes in the impedance, consisting mostly of resistance, produce large changes in the frequency of the circuit so that the circuit is sensitive to the small changes in impedance due to seismic disturbances.

Figure 3:
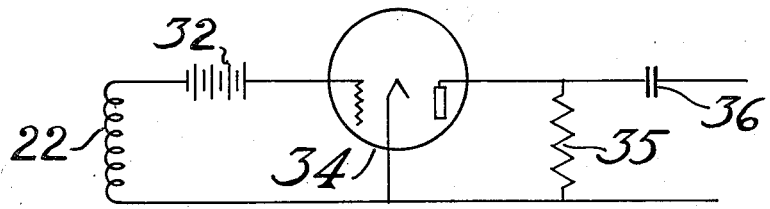
Fig. 3 is a diagrammatic representation of a preferred form of detector for use with the apparatus of Fig. 2.

Referring particularly to Fig. 3, a preferred form of circuit for the detector 23 is illustrated in which the secondary 22 of the transformer 21 is connected through a battery 32 to the grid circuit of a vacuum tube 34. The plate circuit of the vacuum tube 34 is connected to the amplifier 25 through a plate resistance 35 and coupling condenser 36.

Figure 4:
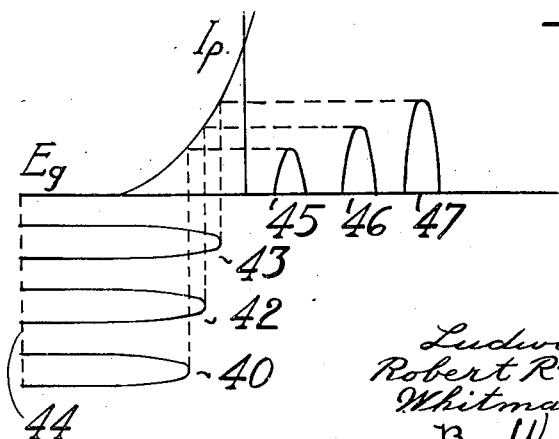
Fig. 4 is a curve in which the biasing voltage is plotted against the current of the tube.

The amount of C-bias necessary is determined as shown in Fig. 4, in which the biasing voltage $E_c$ is plotted against $I_p$, the plate current of the tube 34. The impedance changes of the ground are very small so that a sensitive method of detection must be used. The changes in impedance change the output of the transformer 21 by small amounts. Three cycles of different amplitudes are shown in Fig. 4, their peaks being indicated by numerals 40, 42 and 43. Such a biasing C-voltage is used that no detection is possible until the amplitude of the current in the transformer 21 exceeds a certain magnitude. Thus a negative voltage indicated by the dotted vertical line 4 is used. It is seen that when the amplitude o the voltage is about one-half of that indicated for cycle 40 no plate current flows in the vacuum tube 34. As the amplitude increases to tha shown at 40, plate current will flow in the vac uum tube 34 of a magnitude given by numeral 4! A small increase in the voltage from 40 to 42 wil cause a larger increase such as from 45 to 46 i the plate current of the vacuum tube 44. A further increase in the voltage from 42 to 4 will cause an increase in the plate current sucl as shown at 47. It is evident to those familiar with the art that a very high sensitivity can be obtained by the means here illustrated, since a vacuum tube with a very steep $E_g$—$I_p$ curve can be employed with the C-bias so adjusted that the small changes in impedance due to the seismic disturbances will cause the voltage peaks of the secondary 22 to fall on the steep part of the curve.

When explosions are used for generating the seismic waves, the instant of the explosion is communicated to the instrument location near electrodes 11 and 12, by any one of the means well known to the art, and recorded by the recorder 26. The reflected and refracted waves arriving in the region through which the current flows between the electrodes 11 and 12 cause a change in the electrical impedance of the ground and therefore a change in the current through the region, which changes are recorded by the recorder 26. The resulting record resembles a seismograph record obtained when recording seismic disturbances with an electrical seismograph but differs, however, in many important respects from the conventional seismogram. The energy arriving in a very considerable volume of the ground is used to make the record. Thus the direct waves which travel approximately horizontally to the surface of the earth travel through the region through which the current is flowing in an approximately horizontal direction. These waves therefore require an appreciable time to pass through this region and therefore modify the impedance of the ground more gradually than the reflected waves which arrive from below the volume in a very nearly vertical direction. It is seen therefore that by means of this method, it is possible to discriminate against the surface and direct waves and to record more sharply the reflected waves. The reflected waves which are recorded are reflected nearly vertically upward from a deep earth stratum. They arrive at the region between the electrodes simultaneously and therefore modify the entire length of the lines of electric force between the electrodes.

Various changes may be made within the scope of the appended claims in which it is desired to claim all novelty inherent in the invention as broadly as the prior art permits.

We claim:

1. In an apparatus for measuring changes in electrical impedance of the ground due to seismic disturbances, a source of oscillating current of given high frequency, a transformer the primary of which is connected to the source, a second transformer the primary of which is connected to the secondary of the first mentioned transformer, spaced electrodes in the ground connected in parallel with the adjoining secondary and primary windings of the transformers whereby current of given frequency passes between the electrodes through an extended volume of the ground and change in the impedance of the ground due to the seismic disturbances varies the amount of electric energy flowing through the volume, a detector in the circuit connected to the secondary of the second mentioned transformer, means connected to the detector for amplifying audio-frequencies and means connected to said amplifying means for exhibiting the change in current.

2. A method for locating sub-surface geological anomalies which comprises spacing a pair of electrodes in the ground in the area under investigation, applying an alternating voltage of high frequency to said electrodes whereby an alternating current of high frequency is passed through the ground between the electrodes, causing seismic waves to traverse the portion of the ground traversed by the alternating current whereby the amplitude of the current is modulated and recording only the modulations in the amplitude of the current.

3. An apparatus for determining the modulations in the amplitude of a high frequency current, passed through the earth through which seismic waves are caused to travel simultaneously, which comprises a pair of electrodes adapted to be inserted in the earth at a predetermined distance from each other and electrical connections between said electrodes including a source of high frequency voltage, detecting means for said high frequency voltage, an audiofrequency amplifier connected to the output of said detector and a recorder connected to the output of said amplifier.

4. An apparatus for determining the modulations in the amplitude of a high frequency current passed through a portion of the earth through which seismic waves are caused to travel simultaneously, which comprises a pair of electrodes adapted to be inserted into said portion of the earth at a predetermined distance from each other, an electrical circuit connecting said electrodes, means for supplying high frequency voltage to the input side of said circuit, a detector, means for inductively connecting said detector to the output side of said circuit, an audio-frequency amplifier connected to the output of said detector, and a recorder connected to the output of said amplifier.

5. An apparatus for determining the modulations in the amplitude of a high frequency current passed through a portion of the earth through which seismic waves are caused to travel simultaneously, which comprises a pair of electrodes adapted to be inserted in said portion of the earth at a predetermined distance from each other, the secondary of a transformer connected in parallel to said electrodes, a source of high frequency voltage attached to the primary of said transformer, the primary of a second transformer connected in parallel to said electrodes, a detector connected to the secondary of the second transformer, an audio-frequency amplifier connected to the output of said detector and a recorder connected to the output of said amplifier.

6. An apparatus for determining the effect of seismic waves upon the electrical characteristics of the ground which comprises a pair of electrodes adapted to be inserted in the ground at a selected distance from each other, a source of alternating voltage of high frequency electrically connected to said electrodes, whereby a high frequency current may be passed through the ground between said electrodes in an area where seismic waves are arriving, and means, electrically connected to said electrodes, for recording the modulations in the amplitude of said high frequency current caused by the arriving seismic waves.

LUDWIG W. BLAU.
ROBERT R. THOMPSON.
WHITMAN D. MOUNCE.